United States Patent
Zhang et al.

(10) Patent No.: US 11,405,206 B2
(45) Date of Patent: *Aug. 2, 2022

(54) SYSTEMS AND METHODS FOR MANAGING A COMPROMISED AUTONOMOUS VEHICLE SERVER

(71) Applicant: Beijing Voyager Technology Co., Ltd., Beijing (CN)

(72) Inventors: Jiang Zhang, San Jose, CA (US); Xiaoyong Yi, Fremont, CA (US); Liwei Ren, San Jose, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/413,889

(22) PCT Filed: Dec. 30, 2018

(86) PCT No.: PCT/US2018/068084
§ 371 (c)(1),
(2) Date: Jun. 14, 2021

(87) PCT Pub. No.: WO2020/142056
PCT Pub. Date: Jul. 9, 2020

(65) Prior Publication Data
US 2022/0045859 A1    Feb. 10, 2022

(51) Int. Cl.
*H04L 9/32* (2006.01)
*B60W 60/00* (2020.01)
*H04L 9/08* (2006.01)

(52) U.S. Cl.
CPC ............. *H04L 9/32* (2013.01); *B60W 60/001* (2020.02); *H04L 9/0819* (2013.01)

(58) Field of Classification Search
CPC ....... H04L 9/32; H04L 9/0819; B60W 60/001
See application file for complete search history.

(56) References Cited

U.S. PATENT DOCUMENTS 6,711,679 B1 * 3/2004 Guski .................. H04L 9/3297
713/157
2011/0213968 A1    9/2011 Zhang et al.
(Continued)

FOREIGN PATENT DOCUMENTS

CN    105871816 A    8/2016

OTHER PUBLICATIONS

PCT International Search Report and the Written Opinion dated Apr. 30, 2019, issued in related International Application No. PCT/US2018/068084 (8 pages).
(Continued)

*Primary Examiner* — Abiy Getachew
(74) *Attorney, Agent, or Firm* — Sheppard, Mullin, Richter & Hampton LLP (57) ABSTRACT

Systems and methods for managing a compromised autonomous vehicle server are described herein. A processor may obtain an indication of a first server configured to control an autonomous vehicle being compromised. The autonomous vehicle may have previously been provisioned with a first public key. The first public key may be paired with a first private key. A processor may compile command information. The command information may include a command for the autonomous vehicle and a digital certificate of a second server configured to control the autonomous vehicle in the event of the first server being compromised. The digital certificate may include a second public key and may be signed with the first private key. The command may be signed with a second private key associated with the second server. The second private key may be paired with the second public key.

20 Claims, 3 Drawing Sheets

(56) References Cited

U.S. PATENT DOCUMENTS

| | | | | |
|---|---|---|---|---|
| 2014/0309814 A1* | 10/2014 | Ricci | ............... | H04L 67/12 |
| | | | | 701/2 |
| 2021/0179137 A1* | 6/2021 | Gillett | ............... | G01C 21/3415 |
| 2021/0300425 A1* | 9/2021 | Hyde | ............... | B60W 50/04 |
| 2021/0316742 A1* | 10/2021 | Hayes | ............... | B60W 50/035 |

OTHER PUBLICATIONS

Non-Final Office Action dated Nov. 12, 2021, issued in related U.S. Appl. No. 16/236,602 (12 pages).

* cited by examiner

SYSTEMS AND METHODS FOR MANAGING A COMPROMISED AUTONOMOUS VEHICLE SERVER

CROSS REFERENCE TO RELATED APPLICATION

This application is a national stage application under 35 U.S.C. § 371 of International Patent Application No. PCT/US2018/068084, filed on Dec. 30, 2018, and entitled "Systems and Methods for Managing a Compromised Autonomous Vehicle Server." The content of the above-referenced application is incorporated herein by reference in its entirety.

TECHNICAL FIELD

The disclosure relates generally to managing a compromised autonomous vehicle server.

BACKGROUND

As the autonomous vehicle (AV) does not have a human driver, most commands to the vehicle are received from a cloud server, which may also be known as a Security Operation Center (SOC). Sometimes the autonomous vehicle sends request to the cloud server to request commands or instructions. In some cases, if the cloud server (a.k.a. SOC—Security Operation Center) collects information relevant to AV navigation, such as an accident that blocks a segment of a road, the cloud server may initiate one or more commands to the autonomous vehicle to update the route or assign tasks. The autonomous vehicle may authenticate the server, receive instructions from the server via secure communication, and execute the instructions. These operations are carried out on the basis that the server will send reasonable commands to the autonomous vehicles. However, this AV management system gives a lot of power to the cloud server to control the autonomous vehicles. If the cloud server is compromised, autonomous vehicles may be at risk. For example, massive damage may be caused if a hacker obtains control of the cloud server and send malicious commands to the autonomous vehicles, e.g., thousands of vehicles led to same location could jam traffic or block people within a certain area. In addition, once the cloud server is compromised, amount of time required to restore proper control of the cloud server may be unknown.

SUMMARY

One or more implementations of the systems and methods relate to mitigating possible threats to an autonomous vehicle server. The server may become a target of attacks. As the operating server is exposed on the network with lots of network traffic, it may be an easier target for malicious entities to find out its security vulnerabilities, and to ultimately compromise the server. If there is another server online or available to be brought online that can block the commands from the compromised server and override the commands from compromised server, the damage resulting from the compromised server may be reduced or minimized. Implementations of the systems and methods presented herein contemplate provisioning individual autonomous vehicles with a public key, a public key certificate, or both the public key and the public key certificate of a second server (e.g., second to a first Security Operation Center (SOC)) before the autonomous vehicle are put into operation. With this public key or certificate, the vehicles may authenticate commands originated from the second server. The second server may also hold a private key to issue a command to block or override malicious commands. The second server's private key may be split into several parts and each part can be held by a different administrator. In order to issue the second server's commands, the administrators may have to approve the operation. Each part of the private key may be stored in a separate Hardware Security Module (HSM) or other storage location. This could make overriding of first server's command more difficult. The second server may then issue at least the commands to stop the individual autonomous vehicles safely. In some embodiments, the autonomous vehicle may be provisioned with commands to connect with yet a third server, e.g., the third server's configuration could include the host IP address, port number, and backup server's certificate verification information. The second server may issue a command to instruct the autonomous vehicles to switch to the third sever which may not be compromised. This could block the commands from the compromised server and use the backup (e.g., third) serve to continue the operations.

One aspect of the present disclosure is directed to a method for managing a compromised autonomous vehicle server. The method may comprise: obtaining an indication of a first server configured to control an autonomous vehicle being compromised, the autonomous vehicle having previously been provisioned with a first public key, the first public key being paired with a first private key; compiling command information, the command information including a command for the autonomous vehicle and a digital certificate of a second server configured to control the autonomous vehicle in the event of the first server being compromised, the digital certificate including a second public key and being signed with the first private key, the command being signed with a second private key associated with the second server, the second private key paired with the second public key; and wherein the command information facilitates: verifying, at the autonomous vehicle, the digital certificate using the first public key; in response to the digital certificate being verified, extracting, from the digital certificate, the second public key; verifying, at the autonomous vehicle, the signature of the command using the second public key; and in response to the signature of the command being verified, executing, at the autonomous vehicle, the command.

Another aspect of the present disclosure is directed to a system for managing a compromised autonomous vehicle server. The system may comprise one or more processors and a memory storing instructions. The instructions, when executed by the one or more processors, may cause the system to perform: obtaining an indication of a first server configured to control an autonomous vehicle being compromised, the autonomous vehicle having previously been provisioned with a first public key, the first public key being paired with a first private key; compiling command information, the command information including a command for the autonomous vehicle and a digital certificate of a second server configured to control the autonomous vehicle in the event of the first server being compromised, the digital certificate including a second public key and being signed with the first private key, the command being signed with a second private key associated with the second server, the second private key paired with the second public key; and wherein the command information facilitates: verifying, at the autonomous vehicle, the digital certificate using the first public key; in response to the digital certificate being verified, extracting, from the digital certificate, the second public key; verifying, at the autonomous vehicle, the signature of the command using the second public key; and in response to the signature of the command being verified, executing, at the autonomous vehicle, the command.

In some embodiments, the command may include instructions to perform a safety stop by the autonomous vehicle.

In some embodiments, the command may include instructions to connect to a third server configured to control the autonomous vehicle.

In some embodiments, the step of compiling the command information may be performed at the second server.

In some embodiments, compiling the command information may include: obtaining access to a set of storage locations, wherein an individual storage location of the set of storage locations store an individual part of the second private key; accessing, from the set of storage locations, individual parts of the second private key stored in individual storage locations of the set of storage locations; and assembling the individual parts of the second private key to form the second private key.

In some embodiments, obtaining the access to the set of storage locations may be accomplished through provision of passwords.

In some embodiments, the autonomous vehicle may be part of a fleet of autonomous vehicles such that operations of the system may be performed for individual autonomous vehicle of the fleet of autonomous vehicles.

In some embodiments, system may further perform the steps of: verifying, at the autonomous vehicle, the digital certificate using the first public key; in response to the digital certificate being verified, extracting, from the digital certificate, the second public key; verifying, at the autonomous vehicle, the command using the second public key; and in response to the signature of the command being verified, executing, at the autonomous vehicle, the command.

In some embodiments, the first server may be a Security Operation Center.

In some embodiments, executing the instructions may further cause the system to perform encrypting/decrypting the command information.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein improve functioning of computing systems that manage autonomous vehicles. One or more techniques are presented herein may include provision of individual autonomous vehicles with a public key, a public key certificate of a second server (e.g., second to a first Security Operation Center (SOC) or other server), or a combination of the public key and public key certificate before the autonomous vehicles are put into operation. With this public key or certificate, the vehicles may authenticate commands originated from the second server. The second server may also hold private key to issue a command to block or override malicious commands.

Figure 1:
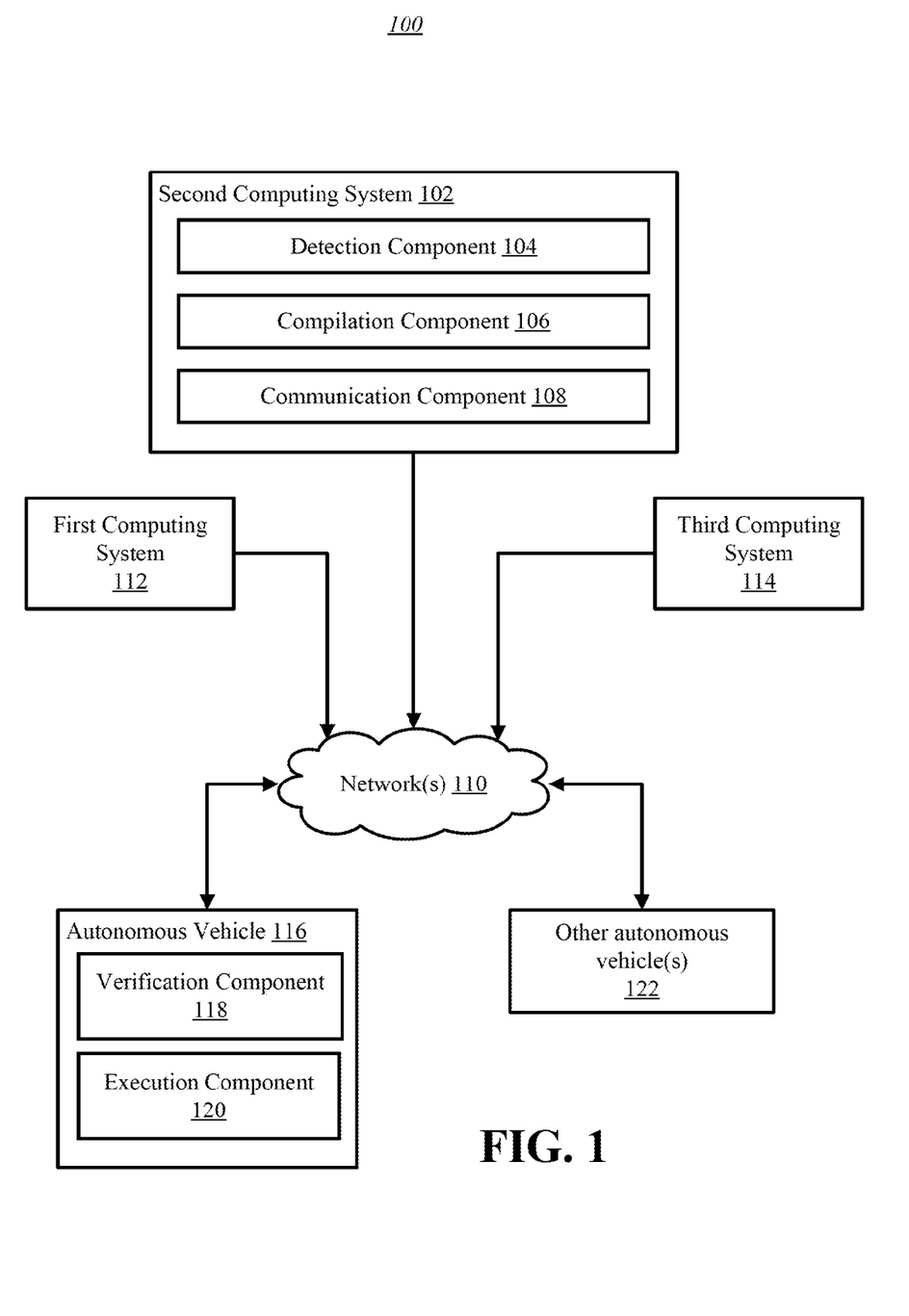
FIG. 1 illustrates an example environment for managing a compromised autonomous vehicle server, in accordance with various embodiments of the disclosure.

FIG. 1 illustrates an example system 100 for managing a compromised autonomous vehicle server, in accordance with various embodiments. The example system 100 may include one or a combination of a first computing system 112, a second computing system 102, a third computing system 114, an autonomous vehicle 116, or one or more other autonomous vehicles 122.

The first computing system 112 may represent a server (e.g., dedicated sever) or cloud server (e.g., logical or physical server built, hosted, and delivered through a cloud computing platform over the Internet), which may also be known as a Security Operation Center (SOC), configured as a primary means of controlling autonomous vehicles. For example, the first computing system 112 may collect information such as accidents, may initiate some commands to the autonomous vehicles to update routes or assign tasks, or otherwise control autonomous vehicles. The first computing system 112 may include one or more processors and memory (e.g., permanent memory, temporary memory). The processor(s) may be configured to perform various operations by interpreting machine-readable instructions stored in the memory. The first computing system 112 may include other computing resources. The first computing system 112 may have access (e.g., via one or more connections, via one or more networks 110) to other computing resources or other entities participating in the system 100.

The third computing system 114 may represent a backup server or a backup cloud server, which may also be known as a backup Security Operation Center (SOC), configured as a backup means of controlling autonomous vehicles. The third computing system 114 may be configured the same as, or substantially the same as, the first computing system 112. The second computing system 102 may represent a special purpose server or a special purpose cloud server intended to initiate one or more features and functions of the systems and methods presented herein in the event the first computing system 112 is compromised. The third computing system 114 may include one or more processors and memory (e.g., permanent memory, temporary memory). The processor(s) may be configured to perform various operations by interpreting machine-readable instructions stored in the memory. The third computing system 114 may include other computing resources. The third computing system 114 may have access (e.g., via one or more connections, via one or more networks 110) to other computing resources or other entities participating in the system 100.

It is noted that while some features and functions of the systems and methods presented herein may be directed to the autonomous vehicle 116, this is for illustrative purposes only and not to be considered limiting. For example, it is to be understood that other autonomous vehicle included in the one or more other autonomous vehicles 122 may be configured the same as or similar to autonomous vehicle 116 and may include the same or similar components, described herein. The autonomous vehicle 116 and the one or more other autonomous vehicle 122 may represent a fleet of autonomous vehicles.

The second computing system 102 may include one or more processors and memory (e.g., permanent memory, temporary memory). The processor(s) may be configured to perform various operations by interpreting machine-readable instructions stored in the memory. The second computing system 102 may include other computing resources. The second computing system 102 may have access (e.g., via one or more connections, via one or more networks 110) to other computing resources or other entities participating in the system 100.

The second computing system 102 may include one or a combination of a detection component 104, a compilation component 106, or a communication component 108. While the second computing system 102 is shown in FIG. 1 as a single entity, this is merely for ease of reference and is not meant to be limiting. One or more components or one or more functionalities of the second computing system 102 described herein may be implemented in a single computing device or multiple computing devices. In some embodiments, one or more components or one or more functionalities of the second computing system 102 described herein may be implemented in one or more networks 110, one or more endpoints, one or more servers, or one or more clouds.

The communication component 108 may provision autonomous vehicle 116 with a first public key of a public key certificate (e.g., a digital certificate) owned by the second computing system 102. The first public key may be a root certificate authority (CA) public key. The first public key may be provisioned in a factory before the autonomous vehicle 116 may be put into operation. The first public key may be unchangeable. For example, the first public key may be stored in fuse or secure memory within autonomous vehicle 116. The first public key may be paired with a first private key. The first private key may be the CA's private key. In some embodiments, system 100 may alternatively employ a symmetric key to carry out the features and/or functions of the first private key and the second private key as described herein. For example, autonomous vehicle 116 may be provisioned with a symmetric key specifically to authenticate the command from the second computing system 102.

The public key certificate may include one or a combination of a serial number, a subject, an issuer, a not before date, a not after date, a key usage, an extended key usage, a second public key (e.g., the subject's public key), a signature algorithm, or a signature. The serial number may be used to uniquely identify the certificate within a certificate authority's (CA's) systems. The subject may identify the entity a certificate belongs to, e.g., one or a combination of a machine, an individual, or an organization. In embodiments described herein, the subject may be the second computing system 102. The issuer may identify an entity that verified the information and signed the certificate. The not before date may identify the earliest time and date on which the certificate may be valid. The not after date may identify a time and date past which the certificate may be no longer valid. The key usage may include valid cryptographic uses of the certificate's public key. Common values may include one or a combination of digital signature validation, key encipherment, or certificate signing. The extended key usage may include applications in which the certificate may be used. The second public key may include a public key belonging to the certificate subject. The signature algorithm may be the algorithm used to sign the public key certificate. The signature may be a digital signature of the CA by the first private key. The public key certificate may be verifiable by the first public key which is the CA's public key.

The second public key in the digital certificate may be paired with a second private key of the second computing system 102. The second private key may be split into several parts. Individual parts may be controlled by, or made accessible to, different administrators. In order to issue commands from the second computing system 102, one or more of the administrators may have to approve the operation. Each part of the second private key may be stored in an individual storage location. Accordingly, a set of storage locations may be provided. An individual storage location of the set of storage locations may store an individual part of the first private key. An individual storage location may include a Hardware Security Module (HSM).

The detection component 104 may obtain an indication of the first computing system 112 being compromised. The first computing system 112 may be compromised by an outside entity. The first computing system 112 may be compromised by virtue of the outside entity intercepting commands being sent to autonomous vehicles from the first computing system 112, providing new (e.g., malicious) commands to the autonomous vehicles, or other ways of compromising. The compromising of first computing system 112 may refer generally to the first computing system 112 being hacked. Examples of how the first computing system 112 may be detected as being compromised include one or a combination of: an administrator may not be able to control the first computing system 112 and may report the first computing system 112 is compromised; the second computing system 102 may collect the status of the autonomous vehicles, and if it detects abnormal vehicle behavior (e.g., all the vehicles go to same location), the second computing system 102 may determine the first computing system 112 is compromised; unexpected accidents caused by malicious commands may be detected; or unexpected commands may be sent to vehicles and detected from network traffic logs of the autonomous vehicles.

The compilation component 106 may compile command information. The command information may include a command for the autonomous vehicle 116, a digital certificate of the second computing system 102, or a combination of the command and the digital certificate. The digital certificate may include the second public key and a digital signature of the CA by the first private key, e.g., the CA' private key. The command may be signed with the second private key associated with the second computing system 102. The command may be verifiable by the second public key included in the digital certificate. By way of non-limiting illustration, the second public key may be paired with the second private key. In some embodiments, compilation component 106 may encrypt the command information. The second computing system 102 may request the autonomous vehicle's 116 certificate to extract a public key of the autonomous vehicle 116 for encryption.

The command may include instructions to perform one or a combination of executing a safety stop, disconnecting from the first server and connecting to the third computing system 114 to obtain control instructions/commands from the third computing system 114, or other operations. A safety stop may include instructions to direct autonomous vehicle 116 to a location where autonomous vehicle 116 can stop, shut down the motor and stand by until receiving further instructions. Connecting to the third computing system 114 may cause autonomous vehicle 116 to obtain commands from the third computing system 114.

The compilation component 106 may access the second private key by performing one or a combination of: obtaining access to the set of storage locations; accessing, from the set of storage locations, individual parts of the second private key stored in individual storage locations of the set of storage locations; or assembling the individual parts of the second private key to form the second private key. The compilation component 106 may obtain the access to the set of storage locations through provision of passwords by administrators into the individual storage locations of the set of storage locations.

The communication component 108 may communicate the command information or other information to the autonomous vehicle 116. The communication may be facilitated via network(s) 110. Network(s) 110 may include the Internet or other networks.

The autonomous vehicle 116 may include one or more processors and memory (e.g., permanent memory, temporary memory). The processor(s) may be configured to perform various operations by interpreting machine-readable instructions stored in the memory. The autonomous vehicle 116 may include other computing resources. The autonomous vehicle 116 may have access (e.g., via one or more connections, via one or more networks 110) to other computing resources or other entities participating in the system 100.

The autonomous vehicle 116 may include one or more of a verification component 118, an execution component 120, or other components.

The verification component 118 may obtain the command information communicated by second computing system 102. The verification component 118 may verify, at the autonomous vehicle 116, the digital certificate included in the command information. The verification may be performed using the first public key provisioned to the autonomous vehicle 116. The first public key may verify the digital certificate because the first public key should be paired with the first private key used to generate the digital signature of the certificate.

The verification component 118 may, in response to the digital certificate being verified, extract the second public key from the digital certificate.

The verification component 118 may verify, at the autonomous vehicle 116, the signature of the command included in the command information. The signature of the command may be verified using the second public key extracted from the digital certificate. The second public key should be paired with the second private key used to sign the command.

The execution component 120 may, in response to the signature of the command being verified, execute the command at the autonomous vehicle 116. Executing the command may include controlling the autonomous vehicle 116 to maneuver as dictated by the command. Maneuvers may include accelerating, decelerating, turning, stopping, shutting down a motor of the autonomous vehicle 116 and stand by for next command, or other maneuvers.

Figure 2:
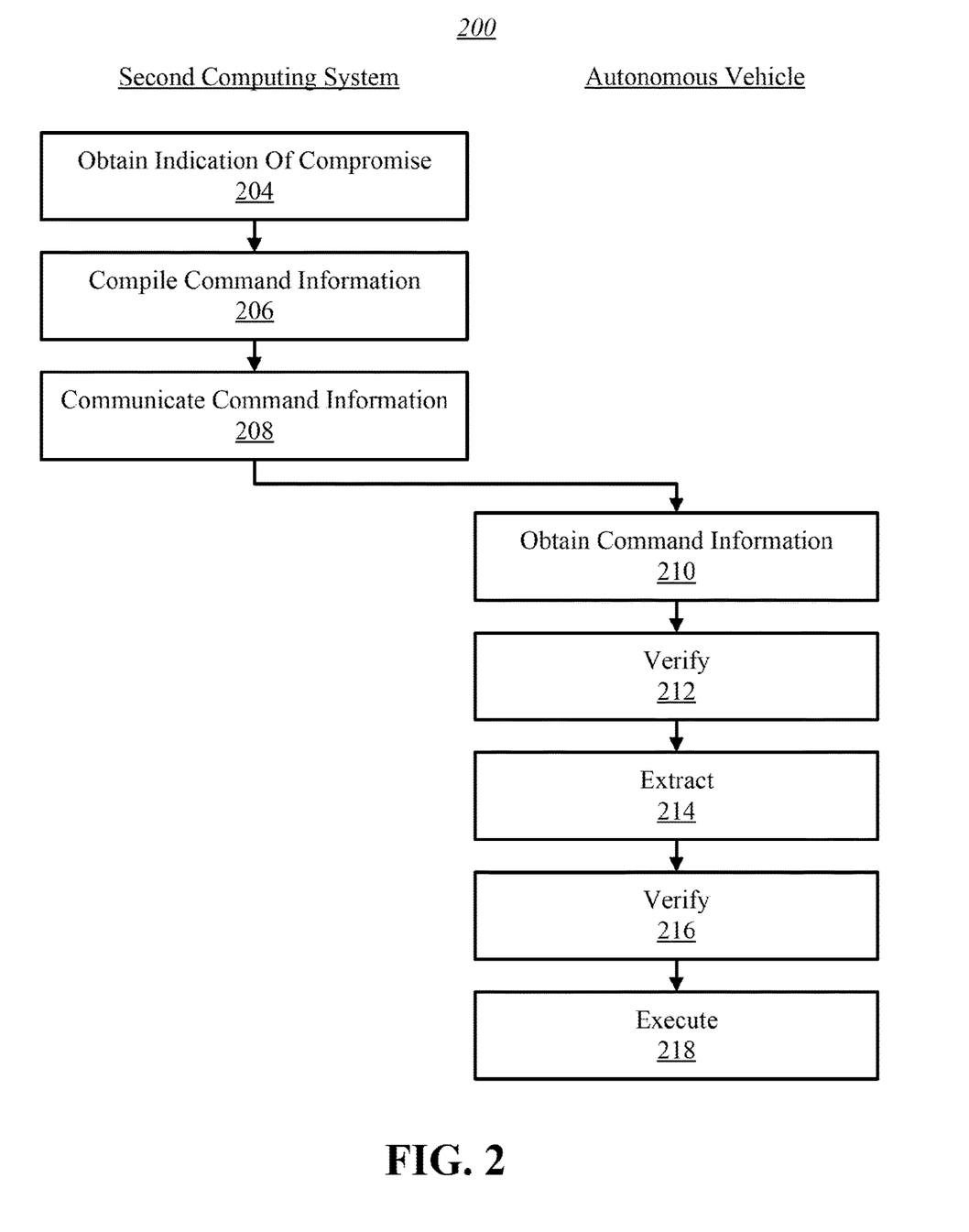
FIG. 2 illustrates an example flow chart of managing a compromised autonomous vehicle server, in accordance with various embodiments of the disclosure.

FIG. 2 illustrates an example flow chart 200 for managing a compromised autonomous vehicle server, in accordance with various embodiments of the disclosure. At block 204, an indication of a first server configured to control an autonomous vehicle being compromised may be obtained. The autonomous vehicle may have previously been provisioned with a first public key. The first public key may be paired with a first private key. At a block 206, command information may be compiled. The command information may include a command for the autonomous vehicle and a digital certificate of a second computing system configured to control the autonomous vehicle in the event of the first computing system being compromised. The digital certificate may include a second public key and a signature signed with the first private key. The command may be signed with a second private key associated with the second computing system. At a block 208, the command information may be communicated to the autonomous vehicle. At a block 210, the autonomous vehicle may obtain the command information. At a block 212, the autonomous vehicle may verify the digital certificate using the first public key. At a block 214, in response to the digital certificate being verified, the second public key may be extracted from the digital certificate. At a block 216, the autonomous vehicle may verify the signature of the command using the second public key. At a block 218, in response to the signature of the command being verified, the autonomous vehicle may execute the command.

Figure 3:
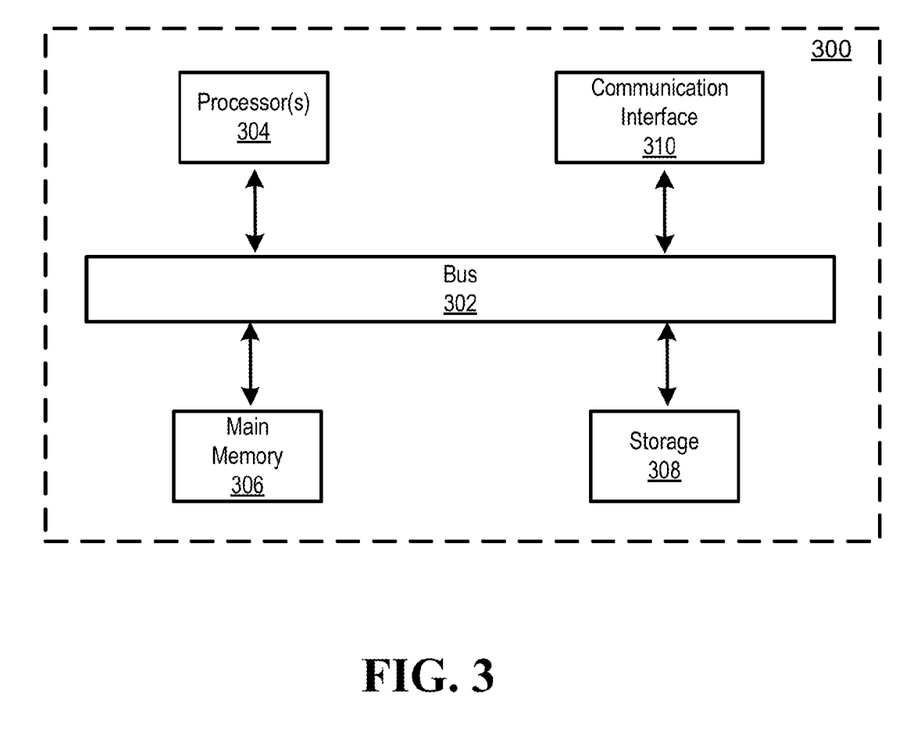
FIG. 3 illustrates a block diagram of an example computer system in which any of the embodiments described herein may be implemented.

FIG. 3 is a block diagram that illustrates a computer system 300 upon which any of the embodiments described herein may be implemented. The computer system 300 includes a bus 302 or other communication mechanism for communicating information, one or more hardware processors 304 coupled with bus 302 for processing information. Hardware processor(s) 304 may be, for example, one or more general purpose microprocessors.

The computer system 300 also includes a main memory 303, such as a random access memory (RAM), cache and/or other dynamic storage devices, coupled to bus 302 for storing information and instructions to be executed by processor(s) 304. Main memory 306 also may be used for storing temporary variables or other intermediate information during execution of instructions to be executed by processor(s) 304. Such instructions, when stored in storage media accessible to processor(s) 304, render computer system 300 into a special-purpose machine that is customized to perform the operations specified in the instructions. Main memory 306 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor(s) 304 executing one or more sequences of one or more instructions contained in main memory 306. Such instructions may be read into main memory 306 from another storage medium, such as storage device 308. Execution of the sequences of instructions contained in main memory 306 causes processor(s) 304 to perform the process steps described herein. For example, the process/method shown in FIG. 2 and described in connection with this figure can be implemented by computer program instructions stored in main memory 306. When these instructions are executed by processor(s) 304, they may perform the steps as shown in FIG. 2 and described above. In alternative embodiments, hard-wired circuitry may be used in place of or in combination with software instructions.

The computer system 300 also includes a communication interface 310 coupled to bus 302. Communication interface 310 provides a two-way data communication coupling to one or more network links that are connected to one or more networks. As another example, communication interface 310 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the first computing system 102 and autonomous vehicle 116 may be described as performing or configured for performing an operation, when the components may comprise instructions which may program or configure the first computing system 102 and autonomous vehicle 116 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system for managing a compromised autonomous vehicle server, the system comprising:
   one or more processors; and
   one or more memories storing instructions that, when executed by the one or more processors, cause the system to perform:
      obtaining an indication of a first server configured to control an autonomous vehicle being compromised, the autonomous vehicle having previously been provisioned with a first public key, the first public key being paired with a first private key;
      compiling command information, the command information including a command for the autonomous vehicle and a digital certificate of a second server configured to control the autonomous vehicle in the event of the first server being compromised, the digital certificate including a second public key and being signed with the first private key, the command being signed with a second private key associated with the second server, the second private key being paired with the second public key,
   wherein compiling the commend information comprises:
      obtaining access to a set of storage locations, wherein an individual storage location of the set of storage locations stores an individual part of the second private key;
      accessing, from the set of storage locations, individual parts of the second private key stored in individual storage locations of the set of storage locations; and
      assembling the individual parts of the second private key to form the second private key; and
   wherein the command information facilitates:
      verifying, at the autonomous vehicle, the digital certificate using the first public key;
      in response to the digital certificate being verified, extracting, from the digital certificate, the second public key;
      verifying, at the autonomous vehicle, the command using the second public key; and
      in response to the command being verified, executing, at the autonomous vehicle, the command.

2. The system of claim 1, wherein the command includes instructions to perform a safety stop by the autonomous vehicle.

3. The system of claim 1, wherein the command includes instructions to connect to a third server configured to control the autonomous vehicle.

4. The system of claim 1, wherein the step of compiling the command information is performed at the second server.

5. The system of claim 1, wherein obtaining the access to the set of storage locations is accomplished through provision of passwords.

6. The system of claim 1, wherein executing the instructions further cause the system to perform encrypting and decrypting the command information.

7. The system of claim 1, wherein the system further performs the steps of:

verifying, at the autonomous vehicle, the digital certificate using the first public key;
in response to the digital certificate being verified, extracting, from the digital certificate, the second public key;
verifying, at the autonomous vehicle, the command using the second public key; and
in response to the command being verified, executing, at the autonomous vehicle, the command.

8. The system of claim 1, wherein the first server is a Security Operation Center.

9. A method for managing a compromised autonomous vehicle server, the method comprising:
obtaining an indication of a first server configured to control an autonomous vehicle being compromised, the autonomous vehicle having previously been provisioned with a first public key, the first public key being paired with a first private key;
compiling command information, the command information including a command for the autonomous vehicle and a digital certificate of a second server configured to control the autonomous vehicle in the event of the first server being compromised, the digital certificate including a second public key and being signed with the first private key, the command being signed with a second private key associated with the second server, the second private key being paired with the second public key,
wherein compiling the commend information comprises:
obtaining access to a set of storage locations, wherein an individual storage location of the set of storage locations stores an individual part of the second private key;
accessing, from the set of storage locations, individual parts of the second private key stored in individual storage locations of the set of storage locations; and
assembling the individual parts of the second private key to form the second private key; and
wherein the command information facilitates:
verifying, at the autonomous vehicle, the digital certificate using the first public key;
in response to the digital certificate being verified, extracting, from the digital certificate, the second public key;
verifying, at the autonomous vehicle, the command using the second public key; and
in response to the command being verified, executing, at the autonomous vehicle, the command.

10. The method of claim 9, wherein the command includes instructions to perform a safety stop by the autonomous vehicle.

11. The method of claim 9, wherein the command includes instructions to connect to a third server configured to control the autonomous vehicle.

12. The method of claim 9, wherein the step of compiling the command information is performed at the second server.

13. The method of claim 9, wherein obtaining the access to the set of storage locations is accomplished through provision of passwords.

14. The method of claim 9, wherein executing the instructions further cause the system to perform encrypting and decrypting the command information.

15. The method of claim 9, wherein the method further performs the steps of:
verifying, at the autonomous vehicle, the digital certificate using the first public key;
in response to the digital certificate being verified, extracting, from the digital certificate, the second public key;
verifying, at the autonomous vehicle, the command using the second public key; and
in response to the command being verified, executing, at the autonomous vehicle, the command.

16. The method of claim 9, wherein the first server is a Security Operation Center.

17. A non-transitory computer-readable storage medium configured with instructions executable by one or more processors to cause the one or more processors to perform operations comprising:
obtaining an indication of a first server configured to control an autonomous vehicle being compromised, the autonomous vehicle having previously been provisioned with a first public key, the first public key being paired with a first private key, wherein the autonomous vehicle is part of a fleet of autonomous vehicles such that the instructions are performed for individual autonomous vehicle of the fleet of autonomous vehicles;
compiling command information, the command information including a command for the autonomous vehicle and a digital certificate of a second server configured to control the autonomous vehicle in the event of the first server being compromised, the digital certificate including a second public key and being signed with the first private key, the command being signed with a second private key associated with the second server, the second private key being paired with the second public key,
wherein compiling the commend information comprises:
obtaining access to a set of storage locations, wherein an individual storage location of the set of storage locations stores an individual part of the second private key;
accessing, from the set of storage locations, individual parts of the second private key stored in individual storage locations of the set of storage locations; and
assembling the individual parts of the second private key to form the second private key; and
wherein the command information facilitates:
verifying, at the autonomous vehicle, the digital certificate using the first public key;
in response to the digital certificate being verified, extracting, from the digital certificate, the second public key;
verifying, at the autonomous vehicle, the command using the second public key; and
in response to the command being verified, executing, at the autonomous vehicle, the command.

18. The non-transitory computer-readable storage medium of claim 17, wherein the command includes instructions to perform a safety stop by the autonomous vehicle.

19. The non-transitory computer-readable storage medium of claim 17, wherein the command includes instructions to connect to a third server configured to control the autonomous vehicle.

20. The non-transitory computer-readable storage medium of claim 17, wherein the operations further comprise:
verifying, at the autonomous vehicle, the digital certificate using the first public key;
in response to the digital certificate being verified, extracting, from the digital certificate, the second public key;
verifying, at the autonomous vehicle, the command using the second public key; and in response to the command being verified, executing, at the autonomous vehicle, the command.

* * * * *

UNITED STATES PATENT AND TRADEMARK OFFICE
CERTIFICATE OF CORRECTION

PATENT NO. : 11,405,206 B2
APPLICATION NO. : 17/413889
DATED : August 2, 2022
INVENTOR(S) : Jiang Zhang, Xiaoyong Yi and Liwei Ren It is certified that error appears in the above-identified patent and that said Letters Patent is hereby corrected as shown below:

In the Claims

In Claim 1, Column 10, Line 30, replace "commend" with --command--

In Claim 9, Column 11, Line 28, replace "commend" with --command--

In Claim 17, Column 12, Line 31, replace "commend" with --command--

Signed and Sealed this
Fourth Day of October, 2022

Katherine Kelly Vidal
Director of the United States Patent and Trademark Office